United States Patent [19]
Paron et al.

[11] Patent Number: 5,738,442
[45] Date of Patent: Apr. 14, 1998

[54] WINE THERMOMETER

[76] Inventors: Todd C. Paron, 318 Frederick, #6, San Francisco, Calif. 94117; Amy C. Fritz, 3140 22nd St., San Francisco, Calif. 94110

[21] Appl. No.: 696,109

[22] Filed: Aug. 13, 1996

Related U.S. Application Data

[60] Provisional application No. 60/002,359 Aug. 15, 1995.
[51] Int. Cl.$^6$ .............................. G01K 11/12; G01K 1/14
[52] U.S. Cl. ................................... 374/162; 374/150
[58] Field of Search .................... 374/150, 162; 116/216

[56] References Cited

U.S. PATENT DOCUMENTS

| | | | |
|---|---|---|---|
| 2,357,477 | 9/1944 | Killman | 374/150 |
| 2,660,060 | 11/1953 | Shelton | 374/150 |
| 4,464,064 | 8/1984 | D'Luzansky | 374/162 |
| 4,538,926 | 9/1985 | Chretien | 374/150 |
| 4,859,360 | 8/1989 | Suzuki et al. | 374/162 |
| 4,878,588 | 11/1989 | Ephraim | 374/150 |
| 5,482,373 | 1/1996 | Hutchinson | 374/162 |
| 5,484,205 | 1/1996 | Grupp et al. | 374/162 |

FOREIGN PATENT DOCUMENTS

| | | | |
|---|---|---|---|
| 0059129 | 4/1982 | Japan | 374/162 |
| 0013460 | 11/1904 | Norway | 374/150 |
| 0027255 | 1/1904 | United Kingdom | 374/150 |

*Primary Examiner*—Diego F. F. Gutierrez
*Attorney, Agent, or Firm*—James M. Deimen

[57] ABSTRACT

A wine thermometer for adhesive application to a wine bottle to determine wine temperature therein comprising an adhesive backed flexible plastic substrate having a liquid crystal temperature panel on the substrate, a temperature scale adjacent the panel and quick reference category ranges adjacent the panel whereby the color of a small band of the panel indicates the temperature of the panel substrate, bottle and wine therein. Contrasting colors of bands above and below the small band indicate a 1° or 2° difference in temperature and at the ends of the panel indicate a temperature 1° to 2° beyond the printed temperature at the panel end. In the preferred embodiment a small band indicates the panel temperature by turning a green color. The band thereabove exhibits a tan color and the band therebelow becomes a blue color. Bands further away remain black. When the panel temperature exceeds the printed temperature of the highest band by 1 degree or 2 degrees, the highest band exhibits the blue color. If the panel temperature further increases, the highest band will return to black. In a similar manner the lowest band will exhibit the tan color as the panel temperature decreases 1 or 2 degrees below the printed temperature of the lowest band with the lowest band returning to black as the panel temperature further decreases.

1 Claim, 1 Drawing Sheet

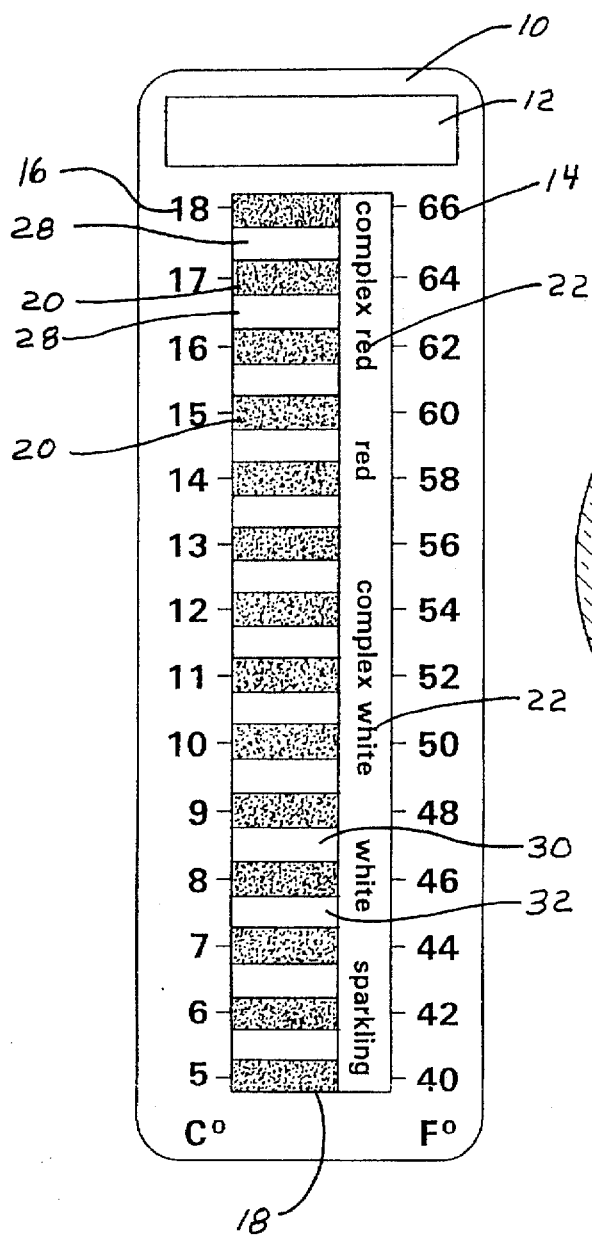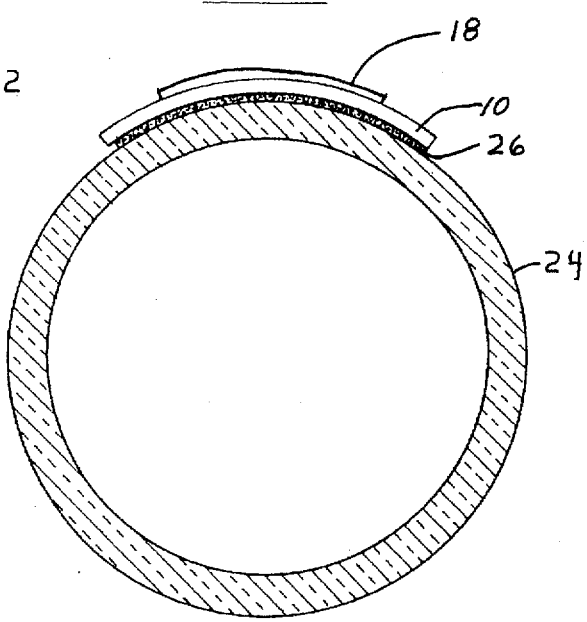

WINE THERMOMETER

BACKGROUND OF THE INVENTION

This application incorporates provisional patent application Ser. No. 60/002359, filed Aug. 15, 1995.

The field of the invention pertains to thermometers and, in particular, to thermometers for the measurement of wine temperature just prior to serving. Heretofore, the wine temperature has been measured just prior to serving by opening the bottle and then inserting a thermometer into the wine in the bottle. Preferably, a means to measure the wine temperature without opening the bottle would be advantageous.

Wine connoisseurs know that the temperature of wine can make a considerable difference in taste and enjoyment and vineyards are responding by listing the correct temperature on most new labels. Serving wine too cold reduces its aroma and flavor, and highlights any bitterness. Serving the wine too warm can make the flavors unpleasantly dull and flat, and the wine seem harshly alcoholic. Typically, the way to measure the temperature of the wine is to withdraw the cork and immerse a conventional thermometer into the wine. If it is determined that the wine is not at the correct temperature, it is too late to compensate by heating or cooling the bottle.

U.S. Pat. No. 3,864,976 discloses a liquid crystal strip or band thermometer that may be attached to a bottle with an elastomeric strip. U.S. Pat. No. 5,304,003 discloses a liquid crystal strip thermometer that is adhesively attached to an aquarium for viewing through the glass and water. Specifically directed to wine bottle temperatures is U.S. Pat. No. 4,538,926 which discloses a single liquid crystal composition that changes color with temperature and a comparison band with which the color can be compared. A symbol in the comparison band indicates the exact temperature for serving the wine in the bottle to which the device is attached.

SUMMARY OF THE INVENTION

The new wine thermometer is designed for measuring and indicating the temperature of a bottle of wine for the consumer or server. Using liquid crystal technology, the wine thermometer comprises a thin patch adhesively attachable to the bottle exterior. With tight adhesive attachment the temperature of the bottle and the wine within can be quickly and accurately determined without damaging the contents. Thus, the new wine thermometer can measure the temperature of the bottle and the wine without disturbing the wine.

By immersing the bottle in warm or cool water or placing in the refrigerator, the server or consumer can obtain the exact temperature recommended by the vintner. This enables the average wine consumer to enjoy wine at the optimum temperature without expensive refrigerated storage or wine temperature control equipment.

Preferably the temperature range on the new wine thermometer is from about 40° F. to 66° F. which covers the ideal consumption temperature ranges for all wines, including sparkling and fortified wines.

The wine thermometer is manufactured by printing the necessary information on an adhesive backed flexible plastic substrate. The adhesive may be semi-permanent and similar to the label adhesive. Or, the adhesive may allow the wine thermometer to be repeatedly removed and applied sequentially to other bottles. The liquid crystal material is formed or coated on the flexible plastic substrate.

As an alternative, the temperature range or scale may include a higher temperature designation or color that changes permanently in the event that the wine bottle exceeds a temperature and time period sufficient to damage the taste of the wine.

There are three ways to determine the appropriate temperature of a particular style of wine with the wine thermometer. First, as illustrated on the drawings, there is the broad classification for quick reference with the following suggested categories listed: sparkling wines, white wines, complex white wines, red wines and complex red wines, also known as fortified wines.

Second, for the above category ranges, the server or consumer can refer to a comprehensive listing of wine styles to find the exact recommended temperature range, as some wines vary from the category to which they appear to belong. The comprehensive listing of wine styles may be found on a card accompanying the packaging for the wine thermometer and kept for future reference by the server or consumer.

Third, if the server or consumer knows the recommended temperature, which is sometimes printed on the wine bottle label, the temperature of the wine bottle can be directly compared to the recommended temperature.

BRIEF DESCRIPTION OF THE DRAWINGS

FIG. 1 illustrates the face of the wine thermometer; and

FIG. 2 is a cross-section through a bottle showing the thermometer adhered thereto.

DESCRIPTION OF THE PREFERRED EMBODIMENT

In FIG. 1 the thermometer comprises a flexible plastic strip 10 having a label area 12 for a logo. The strip has attached thereto by a printing or similar process two vertical scales 14 and 16 of temperature in Fahrenheit and Centigrade respectively over the range of temperatures at which various wines are appropriately served.

Lying between the scales 14 and 16 is a vertical panel 18 comprising a plurality of liquid crystal temperature indicator bands 20 and five quick reference categories 22 printed adjacent the temperature indicators.

The vertical panel 18 of liquid crystal indicator bands 20 changes in composition indicator to indicator along the panel whereby any single indicator band changes in color if the temperature of the panel corresponds to the liquid crystal transition temperature for that particular indicator band. In the preferred embodiment the indicator band corresponding to the temperature changes to green. Optionally the adjacent indicators 28 may also change with the next adjacent indicator band above band 20 becoming tan and next adjacent indicator band below band 20 becoming blue.

In FIG. 2 the wine thermometer 10 is shown attached to a bottle 24 by an adhesive 26 which may be permanent but preferably is non-permanent so that the wine thermometer may be recycled to succeeding bottles. Thus, with the wine thermometer 10 tightly applied to a wine bottle, the temperature of the bottle and wine therein can be easily read without opening the bottle.

For example, if the wine thermometer 10 is applied to a bottle of white wine and the white wine is at the proper temperature for a simple white wine, a green indicator band would appear in the range 44° to 48° F. preferably 46° F. Tan 30 and blue 32 indicator bands would appear above and below the green band at 46 degrees F. If the wine lies one or two degrees below 40° F., the lowest indicator band (at the 40 degree F mark of the scale 14 will indicate tan and similarly, if the upper most indicator band at the 66 degree F mark of the scale 14 is blue, the wine is one or two degrees above 66° F. If the vertical panel 18 remains black, the wine temperature is well beyond the scales of the wine thermometer.

We claim:

1. A wine thermometer comprising an adhesive backed flexible substrate;

a liquid crystal temperature panel having a predetermined color and mounted on the substrate;

at least one temperature scale mounted on the substrate adjacent to the panel; and plural quick reference category ranges corresponding to specific wine categories mounted on the substrate adjacent to the panel;

the liquid crystal temperature panel having a composition differing along the panel so that at a specific panel temperature, a first contrasting color appears in the panel at a location adjacent the corresponding specific panel temperature on the scale and corresponding quick reference category range; and wherein the liquid crystal temperature panel comprises indicator bands having said predetermined color and corresponding to the temperature scale, the first contrasting color appears in an indicator band adjacent the corresponding specific panel temperature on the scale and corresponding quick reference category range; and wherein at said specific panel temperature, second colors appear in the adjacent indicator band above and adjacent indicator band below the indicator band of the first contrasting color, the second colors contrasting with the first contrasting color and with the predetermined color of the other indicator bands.

* * * * *